(12) United States Patent
Spargo

(10) Patent No.: US 8,151,637 B2
(45) Date of Patent: Apr. 10, 2012

(54) APPARATUS AND METHOD FOR TESTING ENGINE AIR INTAKE SYSTEMS

(75) Inventor: Rodney Graeme Spargo, Victoria (AU)

(73) Assignee: Uptime Truck & Trailer Services Pty Ltd., Victoria (AU)

( * ) Notice: Subject to any disclaimer, the term of this patent is extended or adjusted under 35 U.S.C. 154(b) by 310 days.

(21) Appl. No.: 12/609,050

(22) Filed: Oct. 30, 2009

(65) Prior Publication Data
US 2011/0100106 A1 May 5, 2011

(51) Int. Cl.
*G01M 15/09* (2006.01)
(52) U.S. Cl. .............. 73/114.31; 73/49.1; 73/114.37
(58) Field of Classification Search .......... 73/46, 47, 73/49.1, 49.4, 49.7, 114.31, 114.32, 114.33, 73/114.37
See application file for complete search history.

(56) References Cited

U.S. PATENT DOCUMENTS

| | | | |
|---|---|---|---|
| D156,571 S | 12/1949 | Snow | |
| D224,806 S | 9/1972 | Zuck | |
| 4,773,270 A | 9/1988 | Ogasawara et al. | |
| D439,534 S | 3/2001 | Scarrott | |
| D506,832 S | 6/2005 | Neel | |
| D507,657 S | 7/2005 | Neel | |
| 7,225,793 B2 | 6/2007 | Schwulst et al. | |
| 7,647,823 B2 | 1/2010 | Tuski | |
| 7,757,548 B2 * | 7/2010 | Delgado | 73/114.71 |
| D626,869 S | 11/2010 | Spargo | |
| D626,870 S | 11/2010 | Spargo | |
| D626,871 S | 11/2010 | Spargo | |
| D626,872 S | 11/2010 | Spargo | |
| 2009/0229556 A1* | 9/2009 | Delgado | 123/184.53 |

OTHER PUBLICATIONS

Notice of Allowance dated Aug. 18, 2010 for U.S. Appl. No. 29/346,335.
Notice of Allowance dated Aug. 18, 2010 for U.S. Appl. No. 29/346,340.
Notice of Allowance dated Aug. 18, 2010 for U.S. Appl. No. 29/346,326.
Notice of Allowance dated Aug. 18, 2010 for U.S. Appl. No. 29/346,329.

* cited by examiner

*Primary Examiner* — Eric S McCall
(74) *Attorney, Agent, or Firm* — Martin Fleit; Paul D. Bianco; Fleit Gibbons Gutman Bongini & Bianco PL

(57) ABSTRACT

The present invention provides apparatus (100) and methods for testing for leaks in forced-induction internal combustion engine (10) air intake systems. The apparatus (100) includes a plurality of work faces ($132_n$) each having at least one flange ($134_n$) disposed thereon for attaching the apparatus (100) to an air intake system of an engine (10). An air flow valve ($136_n$) is disposed on each work face ($132_n$), those valves ($136_n$) being moveable between open and closed positions. The apparatus (100) also includes a compressed air supply inlet (138) configured to supply compressed air to the air flow valves ($136_n$). Wherein, compressed air can be supplied to the air intake system of engine (10), via an open valve ($136_n$) which is, in use, internal of the intake system, enabling a simulated air pressure test to be performed in order to locate possible intake system leaks.

11 Claims, 5 Drawing Sheets

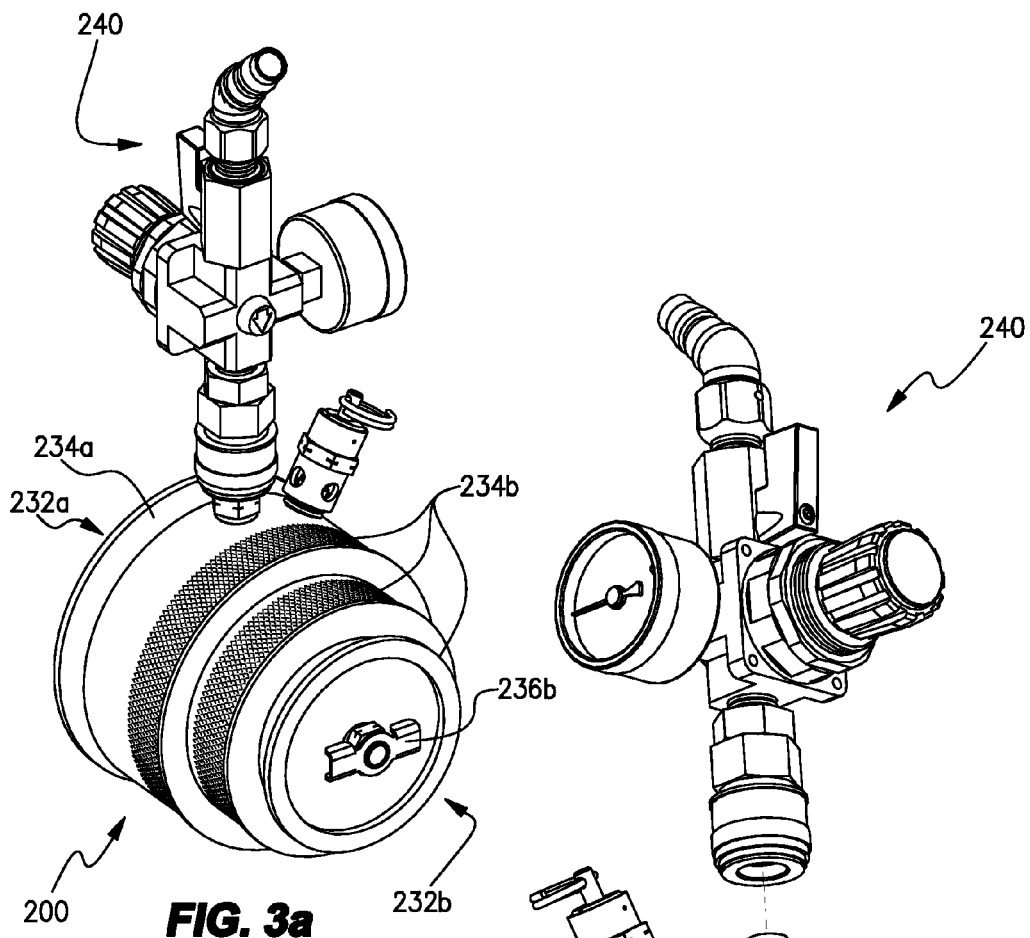
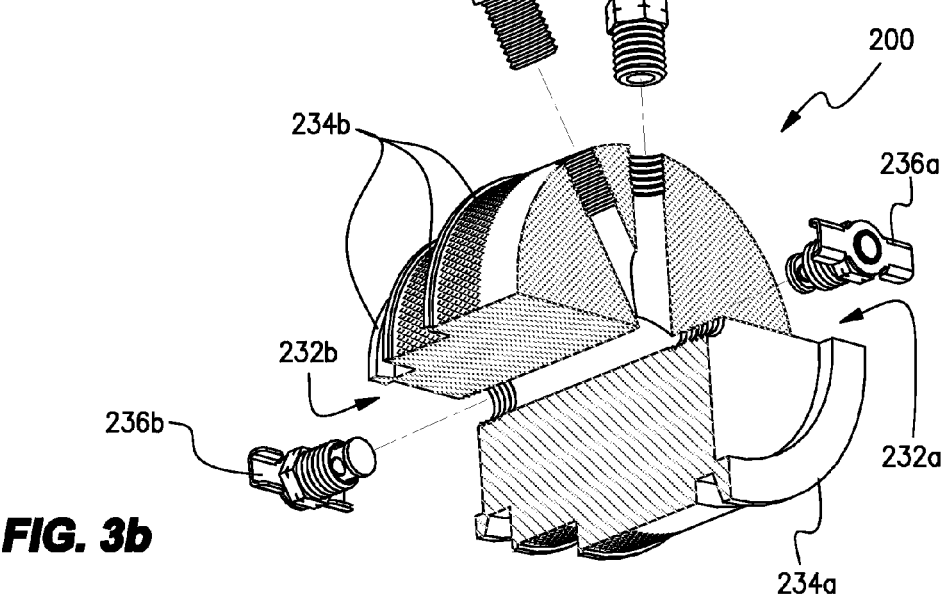
FIG. 3a
FIG. 3b

APPARATUS AND METHOD FOR TESTING ENGINE AIR INTAKE SYSTEMS

TECHNICAL FIELD

The present invention relates generally, to apparatus and methods for testing forced-induction internal combustion engine air intake systems, and relates particularly, though not exclusively, to apparatus and methods for testing turbocharged internal combustion engine air intake systems.

It will be convenient to hereinafter describe the invention in relation to apparatus and methods for testing turbocharged truck diesel engine air intake systems, however it should be appreciated that the apparatus and methods of the present invention are not limited to that use only.

BACKGROUND ART

Any discussion of documents, devices, acts or knowledge in this specification is included to explain the context of the invention. It should not be taken as an admission that any of the material forms a part of the prior art base or the common general knowledge in the relevant art in Australia or elsewhere on or before the priority date of the disclosure herein.

Modern diesel engines are turbocharged for a number of reasons. The main reason being to improve the combustion process inside the cylinders in order to extract the maximum power possible from a given amount of fuel. Other benefits include increased drivability, increase torque, and increased engine throttle response. In the case of large trucks, more torque equates to more pulling power, which is particularly important, for example, when navigating hills or attempting to overtake other vehicles.

A major drawback of turbocharged engines is the phenomenon known as 'turbo lag'. That is, as turbochargers run on exhaust gases, their turbines require a build-up of exhaust before they can power their compressor. This means that an engine must pick up speed before its turbocharger can kick in. Additionally, as inlet air grows hotter as it is compressed, its density is reduced, and thereby so is its efficiency in the cylinders. For this reason, a radiator-like device called an 'intercooler' is commonly used to counter this effect in turbocharged engines.

To help reduce turbo lag and to improve inlet air efficiency, turbocharged diesel engines utilise sealed air intake systems, incorporating intercoolers, to store residual backpressure build up by the oversupply of compressed air from the turbo, so that when the engine accelerates less work is required to reach the desired operating pressure within the intake system.

A problem with such sealed air intake systems is that if they develop leaks the forced-induction system no longer works efficiently. That is, loss of air pressure within a turbocharged intake system results in loss of engine performance, or power output. An unavoidable by-product of this loss of air pressure is increased throttle position, and hence, increased fuel usage. Increased fuel usage leads to higher operating costs, and also increased emissions due to the oversupply of fuel within the combustion chamber for a given amount of air.

Intake system leaks often start off small, which means that vehicle drivers generally tend not to notice the problem for a period of time. In fact, quite often drivers simply notice a mild change in power output, or fuel consumption, but don't necessarily associate those changes with an inlet system leak(s). Even very small leaks can lead to substantial increases in operating expenses over time. For example, if we consider a truck travelling 200,000 kilometers per year that uses 2 liters of diesel per kilometer with an intake system leak, then the required amount of fuel to operate that vehicle would be 100,000 liters. If the fuel efficiency of that truck were to be improved by as little as 5% (i.e. increased to 2.1 liters per kilometer) by fixing that intake system leak, at say $1.20 per liter of fuel, that's a saving of approximately $5,715 a year. Multiply that scenario across a fleet of trucks, and the savings are likely to be quite substantial.

Although some tools for testing to detect leaks in diesel engine air intake systems do exist, it is considered that none are convenient. A need therefore exists for improved apparatus and methods testing engine air intake systems.

DISCLOSURE OF THE INVENTION

According to one aspect of the present invention there is provided an apparatus for testing forced-induction internal combustion engine air intake systems, said apparatus comprising: a plurality of work faces, each of said work faces including at least one flange disposed thereon for removably attaching said apparatus at a selected work face to said engine air intake systems; at least one air flow valve disposed on each of said work faces, said air flow valves being selectively moveable between open and closed positions; and, at least one compressed air supply inlet configured to receive and supply compressed air to said air flow valves, wherein said compressed air can be selectively supplied to said engine air intake systems, via selective open ones of said air flow valves which are, in use, internal of said engine air intake systems, enabling a simulated air pressure test of said engine air intake systems to be performed in order to locate possible intake system leaks.

Preferably the apparatus further comprises at least one pressure release valve to prevent said engine air intake systems from being over pressurised and/or to enable said engine air intake systems to be depressurised after said simulated air pressure test has been performed.

According to a further aspect of the present invention there is provided a method of testing for leaks in turbocharged internal combustion engine air intake systems, said method comprising the steps of: disconnecting a hose or pipe from a turbocharger of said engine air intake system; selecting a work face and associated flange of said apparatus as defined in the preceding paragraphs, such that said flange suits said hose or pipe that was disconnected from said turbocharger; opening an air flow valve of said apparatus adjacent said selected flange, and closing all other air flow valves of said apparatus; attaching said apparatus to said hose or pipe of said engine air intake system in place of said turbocharger; supplying compressed air into said engine air intake system via said supply inlet until a desired simulated air pressure is achieved; and, monitoring and/or checking for leaks in said engine air intake system whilst said simulated air pressure is maintained therein.

BRIEF DESCRIPTION OF THE DRAWINGS

In order that the invention may be more clearly understood and put into practical effect there shall now be described in detail preferred constructions of apparatus and methods for testing truck diesel engine air intake systems in accordance with the invention. The ensuing description is given by way of non-limitative examples only and is with reference to the accompanying drawings, wherein:

FIG. 3a is a perspective view of an apparatus for testing the air intake system of FIG. 1, the testing apparatus being made in accordance with a second preferred embodiment of the present invention, and also being suitable for use with the method of FIG. 2;

FIG. 3b is a partially cross-sectional exploded view of the testing apparatus of FIG. 3a;

MODES FOR CARRYING OUT THE INVENTION

Figure 1:
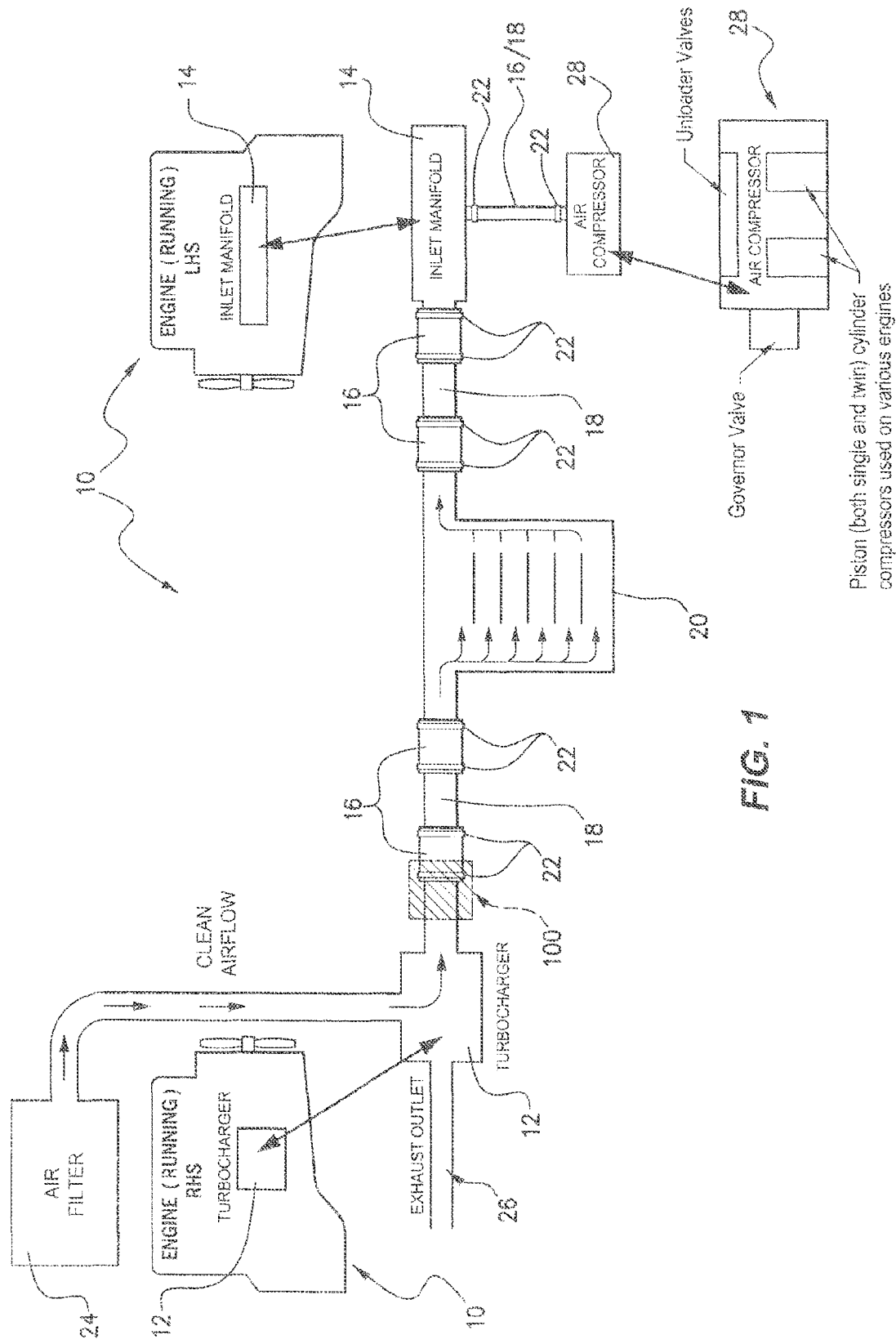
FIG. 1 is a schematic diagram illustrating the operation of a typical turbocharged diesel truck engine air intake system.

In FIG. 1 there is shown a schematic diagram which illustrates the operation of a typical turbocharged diesel truck engine 10. Although shown in the drawings as being a diesel truck engine 10 (hereinafter simply referred to as "engine 10"), it should be understood that the apparatus and methods of the present invention could also be applied to other forced-induction diesel engines and/or any other suitable forced-induction internal combustion engines, as for example, petrol, gas or LPG engines. The present invention should therefore not be construed as limited to the specific examples shown in the drawings.

In FIG. 1, engine 10 is shown in operation, i.e. engine 10 is running. Referring to the drawing it can be seen that engine 10 has a turbocharger 12 disposed on its right hand side, which supplies compressed air to an inlet manifold 14 disposed on its left hand side. It will be appreciated that the layout and positioning of turbocharger 12 and inlet manifold 14 could be reversed, or otherwise provided, depending on the specific make of engine 10.

Turbocharger 12 is interconnected with inlet manifold 14 in a sealed manner, that is, engine 10 is provided with a sealed air intake system. The sealed connection between turbocharger 12 and inlet manifold 14 is provided via a series of hoses 16 and pipes 18. Also provided between turbocharger 12 and inlet manifold 14 is an intercooler 20 that is used to cool the compressed air produced by turbocharger 12 before same enters the combustion chambers (e.g. cylinders—not shown) of engine 10, via inlet manifold 14. It will be appreciated that an intercooler 20 is not essential to the operation of engine 10. In order to maintain the required sealed connection between hoses 16, pipes 18 and intercooler 20, a series of clamps 22 are used. Depending on the make of engine 10, clamps 22 may simply be typical hose clamps for affixing hoses 16 to knurled, or the likes, sealing surfaces (flanges—not shown) provided on pipes 18, or may be so-called "marmon clamps" used for hoses 16 and pipes 18 having so-called "marmon" flanges (not shown).

A skilled person will appreciate that engine 10 utilises turbocharger 12 to compress clean air supplied via an air filter device (24) in order to force more oxygen into the combustion chamber(s) (not shown). This dramatically increases the burning power of engine 10, which results in a substantial increase in power and torque. Although not shown in FIG. 1, it will be appreciated that turbocharger 12 is composed of two main parts: a compressor, which compresses the clean air in the intake; and a turbine, which draws the exhaust gases from an exhaust manifold (26) and uses them to power the compressor.

The increased power output of a turbocharged engine 10 depends on the amount of pressure the air in the intake is subjected to. That is, the level of boost produced by turbocharger 12. The more compressed the air is, the higher the boost. Diesel truck engines 10 typically run at boost levels of up to 25 PSI.

What is also shown in FIG. 1 (bottom right hand side) is an engine driven (e.g. gear or belt driven) air compressor 28 which is connected to the sealed air intake system of engine 10, adjacent inlet manifold 14. Air compressor 28 is interconnected with the air intake system of engine 10 via hoses 16, pipes 18 and clamps 22. As is shown in the drawing, air compressor 28 may be of any suitable type, as for example, a single or twin piston cylinder type air compressor. Air compressor 28 derives its air supply from the air intake system of engine 10, and uses the compressed air it produces to supply compressed air storage tanks (not shown) on the truck and/or trailer for use, for example, in braking systems, air suspension systems, and/or other ancillary equipment (all not shown). A person skilled in this art will appreciate the operation and use of such a truck air compressor 28 and as such a detailed description of same will not be provided herein.

As was explained at the outset of this description, sealed air intake systems such as that of engine 10 shown in FIG. 1 may develop leaks which result in decreased engine performance, or turbocharger efficiency. Common sources for such leaks include, but are not limited to: loose or faulty clamps 22; damaged hoses 16 and/or pipes 18; damaged intercoolers 20; damaged air compressors 28; and/or, leaking inlet manifold gaskets or other associated seal(s).

In order to routinely test for such engine air intake system leaks, novel and convenient testing apparatus are provided in accordance with the present invention. Associated methods of testing for engine air intake system leaks utilising these (100, . . . , 500) and other similar apparatus (not shown) made in accordance with the teachings of the present invention are also provided herein.

Figure 2:
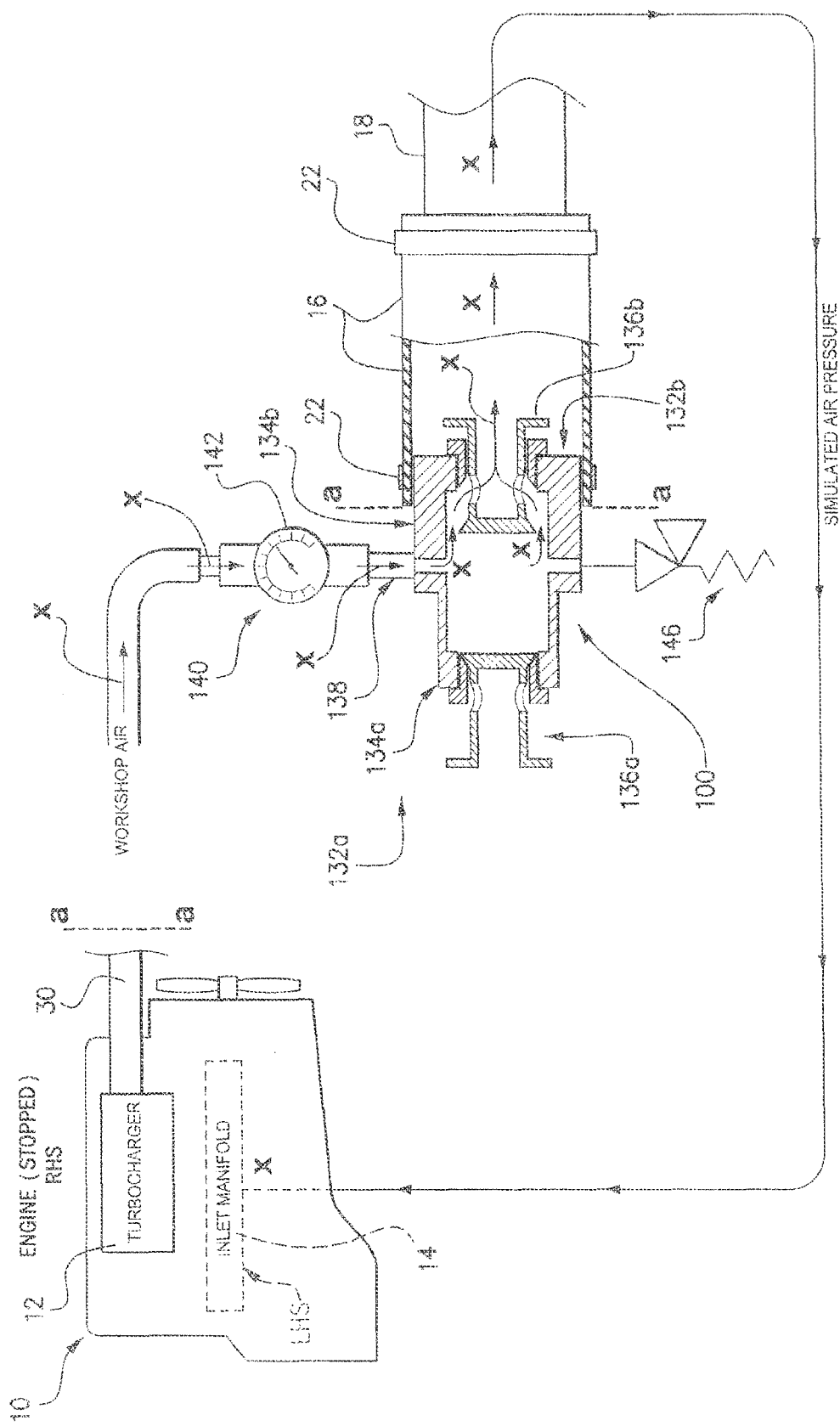
FIG. 2 is a partially cross-sectional schematic diagram illustrating an apparatus and method for testing the air intake system of FIG. 1, the testing apparatus made in accordance with a first preferred embodiment of the present invention.

A first preferred testing apparatus 100, and associated method of testing for leaks in the sealed air intake system of engine 10 of FIG. 1, is shown in FIG. 2. This testing apparatus 100 is non-specific to any particular engine 10 make or model, instead same is simply shown and described in order to demonstrate that (any) testing apparatus made in accordance with the present invention is/are purposely designed to be multi-purpose, that is, to suit a plurality of engine 10 makes or models, and/or to suit a plurality of different hose/pipe 16/18 fittings or flanges.

Referring to FIG. 2, it can be seen that in order to utilise testing apparatus 100, and in turn to be able to test for leaks in the sealed air intake system of engine 10 of FIG. 1, engine 10 must be stopped (i.e. not running). Once engine 10 is stopped, testing apparatus 100 is connected to the air intake system of engine 10 (preferably) in place of turbocharger 12. That is, hose 16 connected to the compressed air outlet (30) of turbocharger 12 is disconnected, and in its place, testing apparatus 100 is connected thereto in order to perform a simulated air pressure test of the air intake system of engine 10, utilising compressed air provided by a workshop air compressor, compressed air tank, or the likes (all not shown).

Figure 4A:
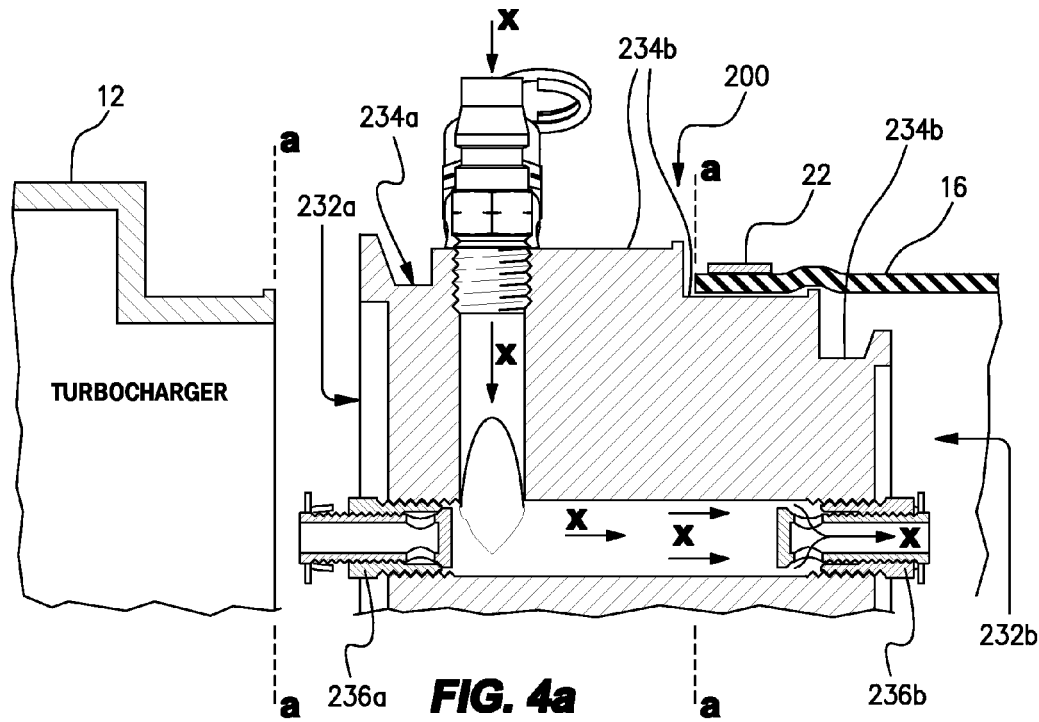
FIGS. 4a & 4b are partial cross-sectional views of the testing apparatus of FIGS. 3a & 3b, each figure illustrating a different mode of operation of the apparatus; and, FIGS. 5a to 5c are plan views of further apparatus for testing the air intake system of FIG. 1, the testing apparatus being made in accordance with third, fourth and fifth preferred embodiments of the present invention, and each being suitable for use with the method of FIG. 2.
Figure 4B:
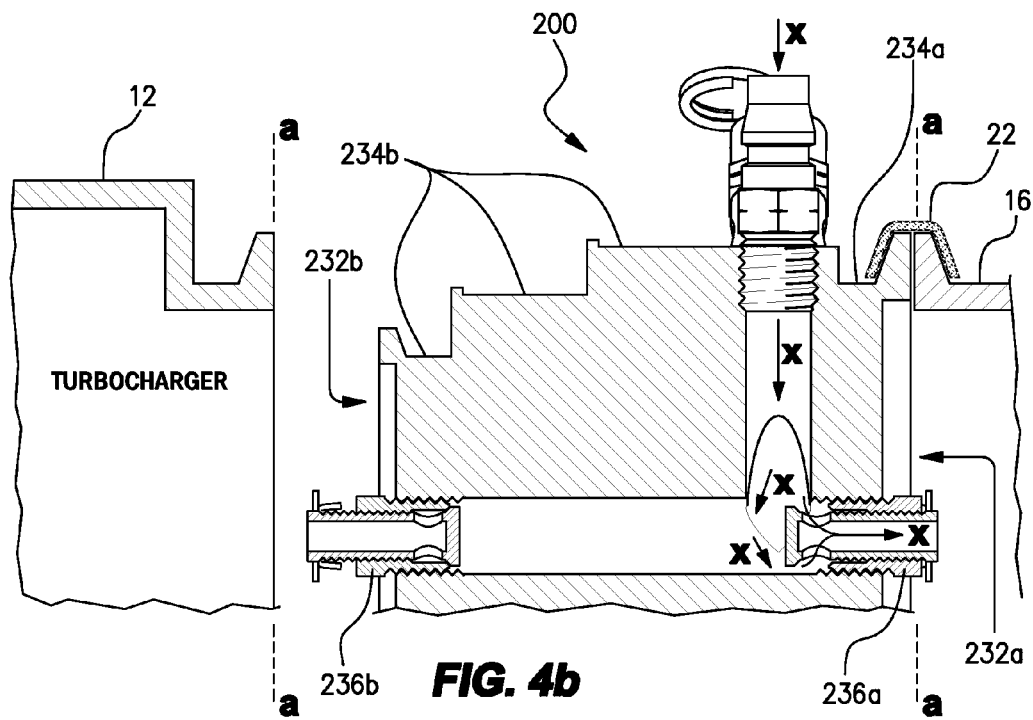

For ease of reference, in FIGS. 2, 4a and 4b, dashed-lines a-a are provided to show where testing apparatus 100 is/are (preferably) positioned in place of turbocharger 12. Similarly, the box (100) shown in dashed-lines in FIG. 1 is provided to illustrate where testing apparatus 100 is preferably placed in order to perform a simulated air pressure test in accordance with the invention. Although not shown in the drawings, it will be appreciated that testing apparatus 100 could be connected to the air intake system of engine 10 at other locations, as for example, in place of, or adjacent, inlet manifold 14, where same would still enable a suitable simulated air pressure test to be performed, however it is recommended that testing apparatus 100 be placed at the location shown in FIG. 1 (and at lines a-a in FIGS. 2, 4a and 4b) if all of the common sources of leaks outlined above are to be detectable as part of a simulated air pressure test performed in accordance with the invention.

Referring again to FIG. 2, it can be seen that in order to enable testing apparatus 100 to suit varying engine 10 types, and/or varying hose/pipe 16/18 sizes, fittings or flanges, apparatus 100 includes a plurality of work surfaces or faces $132_n$, each of which include at least one hose/pipe 16/18 clamp surface or flange $134_n$.

In the embodiment shown in FIG. 2, testing apparatus 100 is cylindrical in shape and includes two work faces $132_a$, $132_b$, one disposed at each end of the cylindrical body of apparatus 100. Each of the work faces $132_a$, $132_b$ of this embodiment having a single hose/pipe 16/18 flange $134_a$, $134_b$. In this drawing, flanges $134_a$, $134_b$ are simply knurled clamp surfaces suitable for use with any typical hose clamp 22. Although knurled type flanges $134_a$, $134_b$ are provided on both work faces $132_a$, $132_b$ of testing apparatus 100 of FIG. 2, same could instead be both marmon-type flanges $134_n$ (see for example, FIG. 5c), or alternatively a combination of knurled and marmon-type flanges $134_n$ could be provided (see for example, FIGS. 3a to 5b) depending on the engine 10 makes and models, etc, required to be tested by apparatus 100.

It will be appreciated that the plurality of work faces $132_n$ of testing apparatus 100 of the present invention need not be disposed at opposite ends of a cylindrical or like body. Of course many other arrangements (not shown) of two or more work faces $132_n$ could be provided in accordance with the invention. For example, although not shown in the drawings, two work faces $132_n$ could be provided on an "L" shaped (or elbow type) testing apparatus, or similarly, three work faces $132_n$ could be provided on a "T" shaped testing apparatus, and so on. A skilled person will appreciate many such variations in design. The present invention should therefore not be construed as limited to the specific examples shown in the drawings. Furthermore, although the embodiment of testing apparatus 100 of FIG. 2 only includes a single hose/pipe 16/18 flange $134_n$ disposed on each work face $132_n$, it will be appreciated that a plurality of such flanges $134_n$ could instead be provided—see for example, FIGS. 3a to 5b.

As testing apparatus 100 has more than one work face $132_n$ that can each be selectively used to perform a simulated air pressure test of the air intake system of engine 10, a tap $136_n$ (or any other suitable air flow valve) is provided on each work face $132_n$ to enable the air flow at each face $132_n$ to be opened or closed as required. For example, in FIG. 2 it can be seen that work face $132_b$ has been positioned for use with the air intake system of engine 10. For this reason, tap $136_b$ (at face $132_b$) has been opened to allow air flow into the air intake system of engine 10 in the direction of arrows x, via apparatus air inlet valve 138, whilst tap $136_a$ (at the then non-working face $132_a$) has been closed to prevent air from escaping the air intake system whilst a simulated air pressure test is being performed in accordance with the invention.

In use, when a simulated air pressure test of the air intake system of engine 10 is to be performed in order to detect possible leaks: the desired work face $132_n$ of testing apparatus 100 is selected (to suit the engine 10 make, or size/type of flange $134_n$); the respective taps $136_n$ are opened or closed as required; and, the testing apparatus 100 is then connected to hose 16 (or pipe 18—using clamp(s) 22) of the air intake system of engine 10 in place of turbocharger 12 (i.e. at line a-a). A compressed air supply fitting 140, having an air pressure gauge 142 associated therewith, is then connected to testing apparatus 100 at air inlet valve 138. Compressed air is then readily fed into the air intake system of engine 10 (in the direction of arrows x) until such time that a desired simulated air pressure level is achieved (say 25 PSI), as determined from air pressure gauge 142. When the desired simulated air pressure is achieved within the air intake system of engine 10, the compressed air supply is shut-off by way of, for example, fitting tap 144 (not shown in FIG. 2—see FIGS. 3a & 3b). Thereafter, air intake system leaks of engine 10 may be detected in a number of ways. For example, if air pressure gauge 142 indicates that the simulated air pressure within the intake system is dropping same would indicate that a leak is present in the system. That leak, or leaks, may be then located by, for example: simply listening for air leakage; applying soapy water to common leak zones, e.g. around clamp fittings 22, etc; and/or, by utilising a suitable leak detecting apparatus (not shown) which detects air movement around common leakage zones.

If leaks are located at that time, the cause of the leak(s) is/are fixed—then—a further simulated air pressure test can be performed once again (if desired) with testing apparatus 100 to see if the problem has been resolved, and/or to locate any further leaks in the intake system. Once all leaks have been repaired, testing apparatus 100 is removed from the air intake system of engine 10, and turbocharger 12 is reconnected to same at hose 16, using clamp 22. Engine 10 may then be operated as normal.

In order to ensure that the air intake system of engine 10 is not over pressurised during the simulated test procedure, and/or to provide a convenient means of quickly depressurising the air intake system of engine 10 after a simulated air pressure test has been performed, testing apparatus 100 is provided with a pressure release valve 146. Pressure release valve 146 is preferably of the type that includes a ring 148 (not shown in FIG. 2) that may be selectively pulled to evacuate the air pressure contained within the air intake system of engine 10 after a test is performed. In the case of diesel truck engines 10, pressure release valve 146 may be rated at say 30 PSI to ensure that the normal operating pressure of air intake system (say up to 25 PSI) of engine 10 is not over pressurised.

In FIGS. 3a to 4b there is shown a second (alternative) preferred testing apparatus 200, which is also suitable to use for testing for leaks in the air intake system of engine 10 of FIG. 2. In FIGS. 3a to 4b like reference numerals to those used to describe first testing apparatus 100 of FIG. 2 are used to denote like parts of second testing apparatus 200.

In FIG. 3a, preferred testing apparatus 200 is shown with a compressed air supply fitting 240 connected thereto. FIG. 3b shows the same testing apparatus 200, but this time it is shown in an exploded (partially cross-sectional) view for illustrative purposes. That is, FIG. 3b conveniently illustrates the external and internal configuration of testing apparatus 200, and more particularly, how it is that compressed air supplied via supply fitting 240 is able to, in use, enter into the air intake system of engine 10 via a selected tap $236_n$ provided on a selected work face $232_n$ of testing apparatus 200.

FIGS. 4a and 4b are provided to clearly illustrate how it is that testing apparatus 200 is configured for 'multipurpose' usage. For example, in FIG. 4a it can be seen that testing apparatus 200 has been positioned for use with hose 16 of the air intake system of engine 10 clamped (22) to work face $232_b$. Here, tap $236_b$ of testing apparatus 200 has been opened, and tap $236_a$ of work face $232_a$ has been closed, so that compressed air supplied via supply fitting 240 (not shown in FIG. 4a) can enter into the air intake system of engine 10 in the direction of arrows x in order to perform the required simulated air pressure test of the invention. Whilst in FIG. 4b, testing apparatus 200 is shown positioned in the reverse orientation, that is, hose 16 is clamped (22) to work face $232_a$, and taps $236_a$, $236_b$ are opened/closed in reverse to that shown in FIG. 4a.

As can be seen in any of FIGS. 3a to 4b, aside from having two work faces $232_a$, $232_b$, testing apparatus 200 also includes a number of hose/pipe 16/18 clamp surfaces or flanges $234_n$. That is, testing apparatus 200 has been purposely designed to suit many different engine 10 makes and models, and/or hoses/pipes 16/18 of varying diameters or form (e.g. knurled clamp surfaces and "marmon-type" flanges). More particularly, at work face $232_a$ of testing apparatus 200 it can be seen that a single "marmon-type" flange $234_a$ is provided to suit like hoses/pipes 16/18. Whereas at work face $232_b$, three separate and varied flanges $234_b$ are provided, the inner most two being conventional knurled type clamp surfaces, and the outer one being a "marmon-type" flange. Hence, in total, four different flanges $234_n$ are provided by testing apparatus 200.

In a practical embodiment, testing apparatus 200 of FIGS. 3a to 4b, having two work faces $232_n$ and four pipe/hose 16/18 flanges $234_n$, can be used to perform simulated air pressure leak detection tests on the air intake systems of many engine 10 makes and models, including, but not limited to: Cummins—models: Signature; ISX; N14; ISM; M11; L10; ISC; and, all EGR models; Caterpillar—models: 3406B; 3406C; 3406E; C12; C15; C16; and, ACERT models; Detroit Series 60—models: DDEC 2; DDEC 3; DDEC 4; DDEC 5; and, DDEC 6 EGR; and, Mack—models: Vmac; E-tech; CCRS; and, MP8.

Figure 5A:
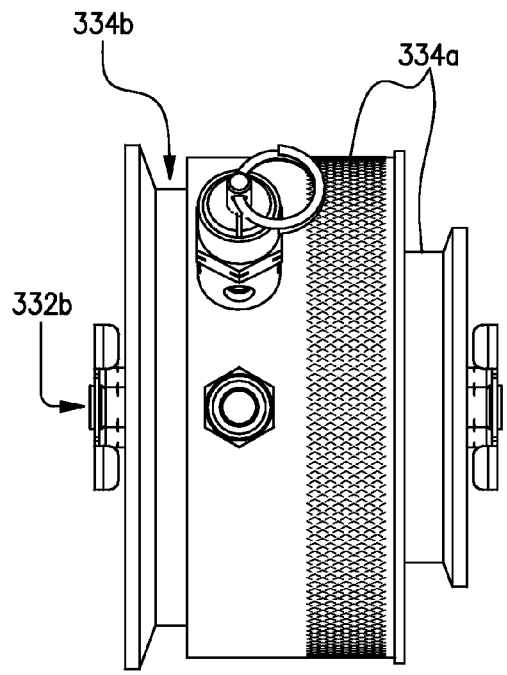
Figure 5B:
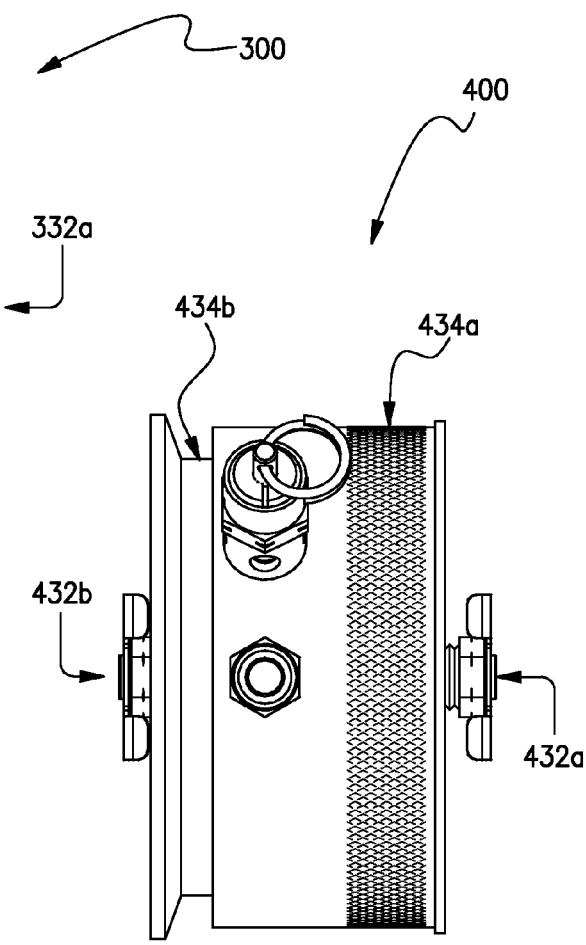
Figure 5C:
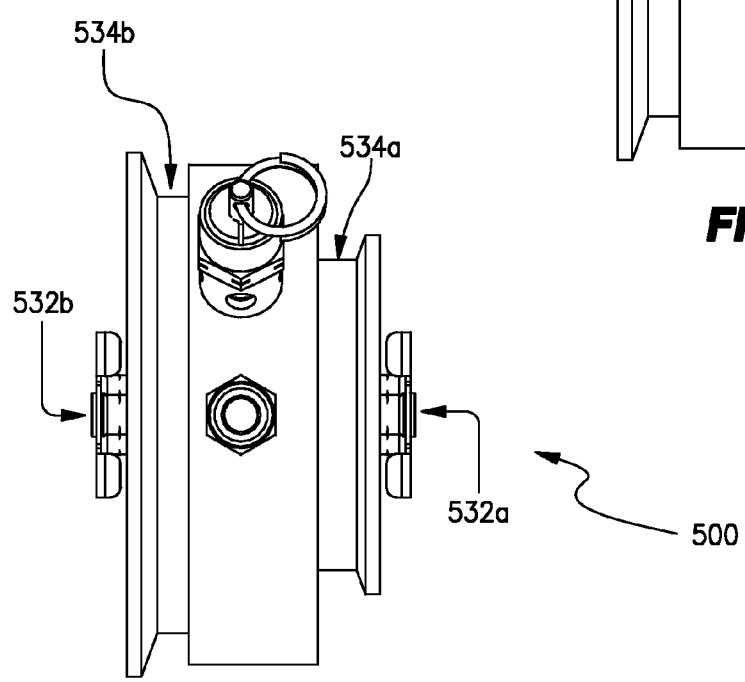

In FIGS. 5a to 5c, there is shown third, fourth and fifth (alternative) preferred testing apparatus 300,400,500, which are also each suitable for use in testing for leaks in the air intake system of engine 10 of FIG. 2. In FIGS. 5a to 5c like reference numerals to those used to describe first and second testing apparatus 100,200 of FIGS. 2 and 3a to 4b are used to denote like parts of third, fourth and fifth testing apparatus 300,400,500.

Each of testing apparatus 300,400,500, operate in the same manner to that of testing apparatus 100,200 previously described. The only differences between these testing apparatus 300,400,500 and those already described (100,200) relate to the configuration or placement of the flanges $334_n$, $434_n$,$534_n$, on respective work faces $332_n$,$432_n$,$532_n$. That is, in FIG. 5a, testing apparatus 300 has two flanges $334_a$ (one "marmon" and one knurled-type flange) disposed on its work face $332_a$, and a single ("marmon-type") flange $334_b$ disposed on its opposite work face $332_b$. Whereas, both testing apparatus 400,500, of FIGS. 5b and 5c respectively, each only have a single flange $434_n$,$534_n$, disposed on their work faces $432_n$,$532_n$, i.e. testing apparatus 400 of FIG. 5b has one knurled-type flange $434_a$ disposed on its work face $432_a$, and one "marmon-type" flange $434_b$ disposed on its opposite work face $432_b$, and, testing apparatus 500 of FIG. 5c has one "marmon-type" flange $534_a$,$534_b$, disposed on each of its work faces $532_a$,$532_b$.

In a practical embodiment, testing apparatus 300 of FIG. 5a, having two work faces $332_n$ and three pipe/hose 16/18 flanges $334_n$, can be used to perform simulated air pressure leak detection tests on the air intake systems of many engine 10 makes and models, including, but not limited to: Cummins—models: Signature; ISX; N14; ISM; M11; L10; ISC; and, all EGR models; Caterpillar—models: 3406B; 3406C; 3406E; C12; C15; C16; and, ACERT models; and, Detroit Series 60—models: DDEC 2; DDEC 3; DDEC 4; DDEC 5; and, DDEC 6 EGR.

Similarly, testing apparatus 400 of FIG. 5b, having two work faces $432_n$ and two pipe/hose 16/18 flanges $434_n$, can be used to perform simulated air pressure leak detection tests on the air intake systems of many engine 10 makes and models, including, but not limited to: Cummins—models: Signature; ISX; and, N14; Caterpillar—models: 3406B; 3406C; 3406E; C12; C15; C16; and, ACERT models; and, Detroit Series 60—models: DDEC 2; DDEC 3; DDEC 4; and, DDEC 5.

Finally, testing apparatus 500 of FIG. 5a, having two work faces $532_n$ and two pipe/hose 16/18 flanges $534_n$, can be used to perform simulated air pressure leak detection tests on the air intake systems of many engine 10 makes and models, including, but not limited to: Cummins—models: Signature; ISX; N14; ISM; M11; L10; ISC; and, all EGR models; Caterpillar—models: C12; and, ACERT models; and, Detroit Series 60—models: DDEC 3; DDEC 4; DDEC 5; and, DDEC 6 EGR.

The present invention therefore provides useful engine air intake system leak testing apparatus (100, . . . , 500) and associated methods that can be used on many makes and models of engine. The particular multipurpose fittings of the preferred apparatus 100, . . . , 500 of FIGS. 3a to 5c being suitable for testing a large cross-section of available, and popular, United States truck engine makes and models, including Cummins, Detroit, Caterpillar and Mack. Of course, although not shown, similar multipurpose apparatus could be readily provided for testing Asian and/or European truck engine makes and models, or similarly for testing any common turbocharged car engine make or model—no matter what the country of origin.

While this invention has been described in connection with specific embodiments thereof, it will be understood that it is capable of further modification(s). The present invention is intended to cover any variations, uses or adaptations of the invention following in general, the principles of the invention and including such departures from the present disclosure as come within known or customary practice within the art to which the invention pertains and as may be applied to the essential features hereinbefore set forth.

Finally, as the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the attached claims. Various modifications and equivalent arrangements are intended to be included within the spirit and scope of the invention. Therefore, the specific embodiments are to be understood to be illustrative of the many ways in which the principles of the present invention may be practiced.

Where the terms "comprise", "comprises", "comprised" or "comprising" are used in this specification, they are to be interpreted as specifying the presence of the stated features, integers, steps or components referred to, but not to preclude the presence or addition of one or more other features, integers, steps, components to be grouped therewith.

The invention claimed is:
1. An apparatus for testing forced-induction internal combustion engine air intake systems, said apparatus comprising:

a plurality of work faces, each of said work faces including at least one flange disposed thereon for removably attaching said apparatus at a selected work face to said engine air intake systems;

at least one air flow valve disposed on each of said work faces, said air flow valves being selectively moveable between open and closed positions; and, at least one compressed air supply inlet configured to receive and supply compressed air to said air flow valves, wherein said compressed air can be selectively supplied to said engine air intake systems, via selective open ones of said air flow valves which are, in use, internal of said engine air intake systems, enabling a simulated air pressure test of said engine air intake systems to be performed in order to locate possible intake system leaks.

2. The apparatus as claimed in claim 1, further comprising at least one pressure release valve to prevent said engine air intake systems from being over pressurised and/or to enable said engine air intake systems to be depressurised after said simulated air pressure test has been performed.

3. The apparatus as claimed in claim 1, wherein said apparatus comprises a cylindrical body, and includes two work faces, one disposed on each end of said cylindrical body.

4. The apparatus as claimed in claim 3, wherein a single air flow valve is disposed on each of said two work faces.

5. The apparatus as claimed in claim 4, wherein said air flow valves are taps.

6. The apparatus as claimed in claim 1, wherein said apparatus has two work faces, each having a single flange disposed thereon.

7. The apparatus as claimed in claim 6, wherein a first flange is a "marmon" flange, and a second flange is a "knurled-type" flange, or both first and second flanges are "marmon" or "knurled-type" flanges.

8. The apparatus as claimed in claim 1, wherein said apparatus has two work faces, a first work face having a single flange disposed thereon, and a second work face having at least two flanges disposed thereon.

9. The apparatus as claimed in claim 8, wherein said second work face includes three flanges disposed thereon.

10. The apparatus as claimed in claim 8, wherein said flanges are selected from "marmon" and/or "knurled-type" flanges.

11. A method of testing for leaks in turbocharged internal combustion engine air intake systems, said method comprising the steps of:

disconnecting a hose or pipe from a turbocharger of said engine air intake system;

selecting a work face and associated flange of said apparatus as claimed in claim 1, such that said flange suits said hose or pipe that was disconnected from said turbocharger;

opening an air flow valve of said apparatus adjacent said selected flange, and closing all other air flow valves of said apparatus;

attaching said apparatus to said hose or pipe of said engine air intake system in place of said turbocharger;

supplying compressed air into said engine air intake system via said supply inlet until a desired simulated air pressure is achieved; and, monitoring and/or checking for leaks in said engine air intake system whilst said simulated air pressure is maintained therein.

\* \* \* \* \*